United States Patent
Corrie

(10) Patent No.: US 9,183,015 B2
(45) Date of Patent: Nov. 10, 2015

(54) HIBERNATE MECHANISM FOR VIRTUALIZED JAVA VIRTUAL MACHINES

(71) Applicant: VMware, Inc., Palo Alto, CA (US)

(72) Inventor: Benjamin J. Corrie, Oakland, CA (US)

(73) Assignee: VMware, Inc., Palo Alto, CA (US)

( * ) Notice: Subject to any disclaimer, the term of this patent is extended or adjusted under 35 U.S.C. 154(b) by 397 days.

(21) Appl. No.: 13/720,874

(22) Filed: Dec. 19, 2012

(65) Prior Publication Data

US 2013/0160011 A1    Jun. 20, 2013

Related U.S. Application Data

(60) Provisional application No. 61/577,211, filed on Dec. 19, 2011.

(51) Int. Cl.
G06F 9/455 (2006.01)
G06F 9/50 (2006.01)

(52) U.S. Cl.
CPC ............ *G06F 9/455* (2013.01); *G06F 9/45558* (2013.01); *G06F 9/5022* (2013.01); *G06F 2009/45583* (2013.01)

(58) Field of Classification Search
None
See application file for complete search history.

(56) References Cited

U.S. PATENT DOCUMENTS

| 7,433,951 | B1 | 10/2008 | Waldspurger | |
|---|---|---|---|---|
| 2003/0188121 | A1* | 10/2003 | Roy et al. | 711/171 |
| 2004/0128670 | A1* | 7/2004 | Robinson et al. | 718/1 |
| 2005/0155011 | A1* | 7/2005 | Heik et al. | 717/100 |
| 2007/0157001 | A1* | 7/2007 | Ritzau | 711/170 |
| 2009/0204963 | A1* | 8/2009 | Swart et al. | 718/1 |
| 2011/0185355 | A1* | 7/2011 | Chawla et al. | 718/1 |
| 2011/0225342 | A1* | 9/2011 | Sharma et al. | 711/6 |
| 2012/0290765 | A1* | 11/2012 | Durrant | 711/6 |

* cited by examiner

*Primary Examiner* — Tuan Dao

(57) ABSTRACT

Methods, systems, and computer programs manage memory of a runtime environment executing on a virtual machine. A controller acts as an intermediary layer between the runtime environment and outside clients. The runtime environment coordinates with the controller to "hibernate" during idle periods to more efficiently utilize memory, and to quickly "refresh" state upon receiving an access attempt. A hypervisor may perform memory page compression on one or more guest "physical" memory pages utilized by an idle runtime environment. While hibernating, the runtime environment may use a listener thread to monitor for refresh requests and awaken the runtime environment when needed.

21 Claims, 6 Drawing Sheets

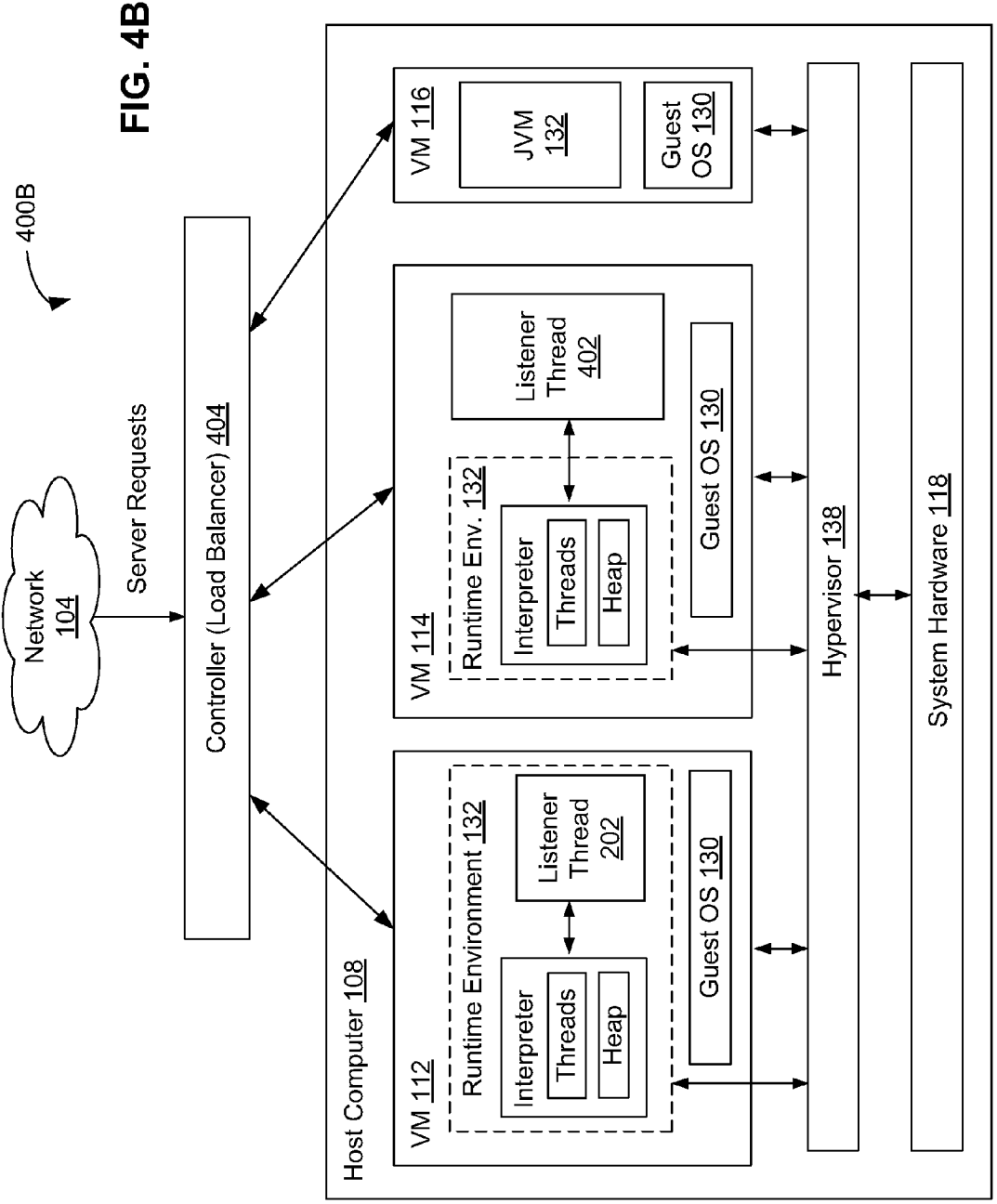

HIBERNATE MECHANISM FOR VIRTUALIZED JAVA VIRTUAL MACHINES

CROSS-REFERENCE TO RELATED APPLICATION

This application claims the benefit of U.S. Provisional Patent Application Ser. No. 61/577,211, filed Dec. 19, 2011, and entitled "Idle Memory Management for Java Virtual Machines," the entire contents of which are incorporated by reference herein.

BACKGROUND

Virtual computing environments allow multiple virtual machines (VMs) to run on a single physical platform and to share physical resources. Some virtual computing environments enable configuration of VMs such that the total amount of memory designated for use by the VMs is larger than the actual amount of memory available on the host. Referred to as memory over-commitment, this feature enables a single physical platform (also referred to herein as a "host") to support the simultaneous execution of more VMs. Some virtual computing environments permit arbitrary boundaries to be placed around computing resources, such as memory, that may span more than one host. For example, a virtual computing environment may create two VMs, each configured with 4 GB of memory, from a resource pool potentially spanning multiple hosts and having a memory limit of less than the 8 GB required (e.g., a 7 GB memory limit.)

Consolidation of computing systems, which leads to the opportunity to over-commit computing resources, such as memory, is one of the key benefits of virtualization. To achieve over-commitment, the virtual infrastructure gives a VM less memory than what the guest operating system (OS) in the VM believes it has. This can be done by using a technique known as ballooning, which is described in U.S. Pat. No. 7,433,951, the entire contents of which are incorporated by reference herein. A balloon is a resource reservation application that runs as a guest application in the VM or as driver in the guest OS and that requests guest physical memory from the guest OS. After the guest OS has allocated guest physical memory for use by the balloon application, the balloon application is able to ultimately communicate information regarding the allocated guest physical memory to a hypervisor that supports the VM, which is then able to repurpose machine memory backing the guest "physical" memory allocated to the balloon application. That is, since the balloon application only reserves guest "physical" memory but does not actually use it, the hypervisor can, for example, repurpose machine memory that backs such allocated guest "physical" memory for use by another VM without fear that the balloon application would write to the guest "physical" memory (and therefore the backed machine memory).

Another technique for memory management is called hypervisor swapping. In this technique, the virtual infrastructure transparently unmaps (i.e., takes away) machine memory pages from the guest OS, swaps the content of guest "physical" memory pages to disk, and frees up machine memory for other VMs. The virtual infrastructure swaps the contents back into machine memory when the guest OS needs to access these guest "physical" memory pages. Both ballooning and hypervisor swapping may impact the performance of applications inside the guest, because there is less machine memory allocated to the guest. However, as long as the total working set of applications running in the guest is at least as large as the guest's machine memory allocation, the application may not suffer significant performance loss.

Unfortunately, there are applications and runtimes that do not work well with memory over-commitment. The Java Virtual Machine (JVM) is one of the most widely used runtimes in this category. In "cloud" environments that provide dynamic allocations of server resources, it has become increasingly popular to offer Java services by deploying JVMs running in VMs sharing resources with a physical host. It may be common for some of these JVMs to endure periods of inactivity, though the JVMs continue to consume valuable resources, such as memory. When the virtual infrastructure is under memory pressure, the virtual infrastructure may transfer this memory pressure to the VMs using the ballooning technique described above to reclaim machine memory that VMs and JVMs executing thereon may no longer be using. However, in the case of a VM running an idle JVM, additional memory pressure on the VM is likely to cause guest OS to instead page out guest "physical" memory pages relied upon by the idle JVM. In this case, when the idle JVM is later needed, for example, for processing server requests, a significant performance cost may be incurred by having to page in guest "physical" memory pages for the JVM from the guest's virtual disk device prior to resuming execution of the JVM. Similarly, the hypervisor swapping technique described above may incur a similar performance cost.

SUMMARY

One or more embodiments of the present invention provide methods, systems, and computer programs for managing memory in a host system in which virtual machines (VMs) execute. A listener thread is deployed inside the Java Virtual Machine (JVM). When a controller determines that the JVM has been inactive for a threshold period of time, the listener thread performs a process for suspending operation of the JVM and signaling to a virtual machine monitor (VMM) that some of the contents of the memory used by the JVM may be paged out and compressed by the hypervisor, thereby freeing some memory for the host system to utilize elsewhere. When the controller detects activity (i.e., incoming requests) for which the JVM must respond to by paging back into memory the contents of the memory used by the JVM, the listener thread restores the compressed pages of memory and refreshes the JVM to resume operation.

A method for managing memory of a runtime environment executing on a virtual machine, according to one embodiment, includes the steps of receiving an indication of an idle state of a runtime environment executing in a virtual machine, and suspending operation of a plurality of threads associated with the runtime environment. The plurality of threads may be configured to run program code within the runtime environment. The method further includes steps of determining a plurality of memory pages associated with the runtime environment based on the indication of the idle state, and transmitting, to a virtualization layer, a request to page out and compress the plurality of memory pages into a compression cache. The method includes executing a listener thread configured to monitor for a refresh request for the runtime environment.

A computer system for executing an application on a host computer executing a plurality of virtual machines therein, according to one embodiment includes a system memory comprising a plurality of memory pages, a virtualization layer, executing on one or more processors, configured to manage sharing of the system memory among a plurality of virtual machines and a first virtual machine of the plurality of virtual machines having a runtime environment and a listener thread executing therein. The runtime environment may have a plurality of threads configured to run program code within the runtime environment. The listener thread may be configured to monitor for "hibernate" requests and "refresh" requests for the runtime environment. The system further includes a controller configured to determine an idle state of the runtime environment, and transmit a hibernate request to the runtime environment indicating the idle state. The runtime environment may be configured to, responsive to receiving the hibernate request, suspend operation of the plurality of threads associated with the runtime environment, determine a plurality of memory pages associated with the runtime environment based on the hibernate request, and transmit, to the virtualization layer, a request to page out and compress the plurality of memory pages into a compression cache.

Further embodiments of the present invention include, without limitation, a non-transitory computer-readable storage medium that includes instructions that enable a processing unit to implement one or more of the methods set forth above or the functions of the computer system set forth above.

BRIEF DESCRIPTION OF THE DRAWINGS

FIGS. 4A and 4B illustrate alternative embodiments of the virtualized computer system of FIG. 1.

DETAILED DESCRIPTION

Figure 1:
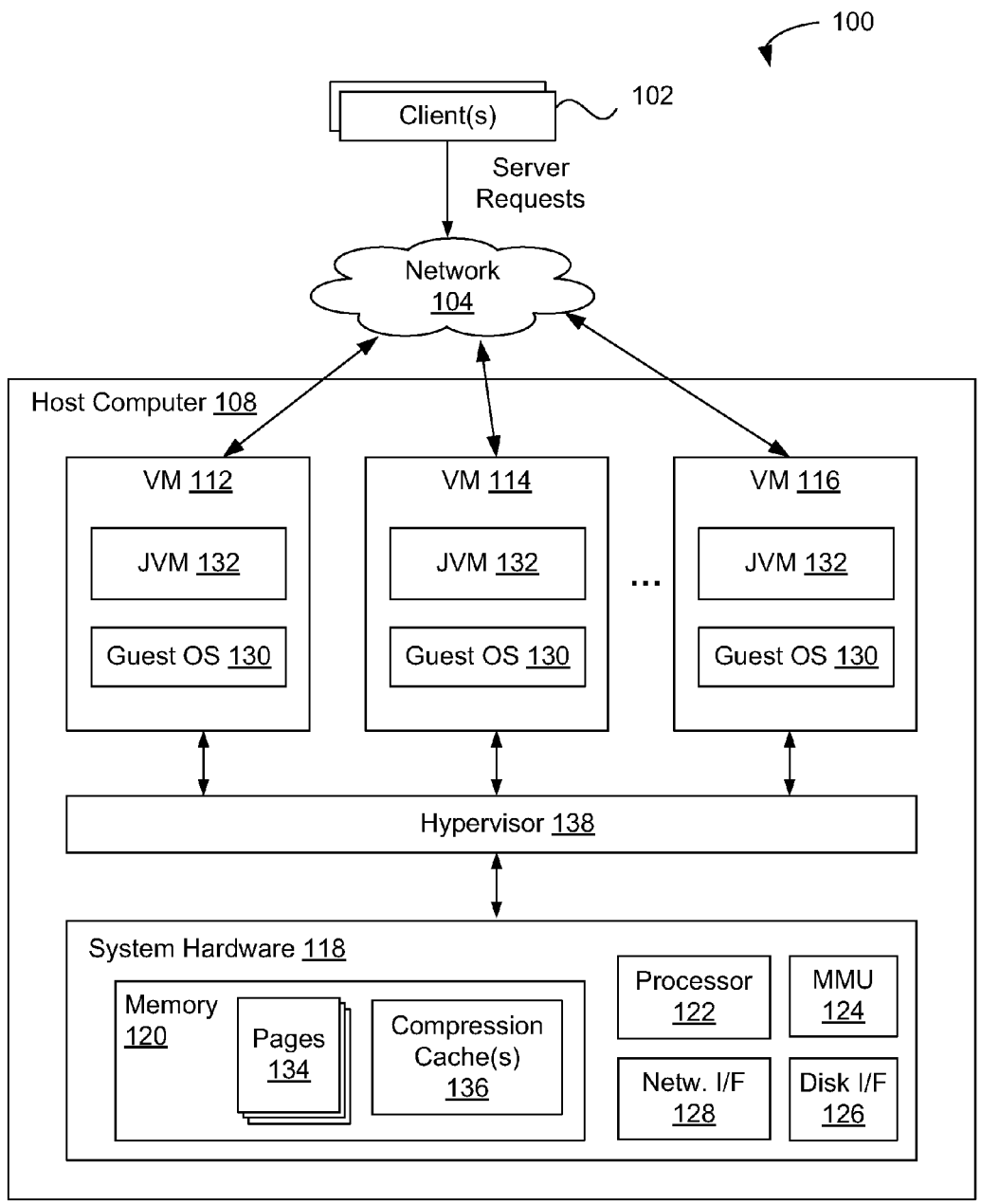
FIG. 1 is a block diagram that illustrates a virtualized computer system with which one or more embodiments of the present invention may be utilized.

FIG. 1 is a block diagram that illustrates a virtualized computer system 100 with which one or more embodiments of the present invention may be utilized. As illustrated, virtualized computer system 100 includes at least one host computer 108 communicatively connected to a plurality of clients 102 via a network 104. Network 104 may be a local area network (LAN) connection, a wide area network (WAN), or other suitable communications network. It is contemplated that virtualized computer system 100 may be one of a plurality of virtualized computer systems comprising a cloud-based infrastructure providing server services to one or more clients 102.

Host computer 108 (also referred to as a "server") is configured to support a virtualized environment and to deliver one or more application services related to information technology, including but not limited to, web services, database services, data processing services, and directory services. In the embodiment shown in FIG. 1, host computer 108 is configured to provide Java application server services, as described in detail below.

As in conventional computer systems, host computer 108 includes both system hardware 118 and system software. System hardware 118 generally includes memory 120 (referred to herein as "machine memory"), a processor 122, some form of memory management unit (MMU) 124 (which may be integrated with processor 122), a disk interface 126, and a network interface 128. Machine memory 120 stores data and software such as an operating system and currently running application programs. Generally, MMU 124 is responsible for managing a virtual memory for processes running in host computer 108 by mapping virtual memory pages to machine memory pages. MMU 124 typically divides virtual memory address space and machine memory address space into blocks of contiguous memory addresses referred to as memory pages 134. In one memory management scheme, MMU 124 is configured to retrieve memory pages 134 from secondary storage via disk interface 126 for use in machine memory 120 and write memory pages 134 out to secondary storage to make more machine memory 120 available.

Machine memory 120 further includes compression caches 136, one of which is provided for each virtual machine (VM) running in host computer 108. As described in greater detail below, each compression cache 136 temporarily stores guest "physical" memory pages in a compressed format. While compression caches 136 are depicted as existing within machine memory 120, it is recognized that compression caches 136 may be stored in machine memory that is physically separate from machine memory 120 or within a different type of memory that is comparable in performance (e.g., similar latency), such as flash memory, DRAM memory, etc.

Processor 122 may be a single processor, or two or more cooperating processors in a known multiprocessor arrangement. Examples of disk interface 126 are a host bus adapter and a network file system interface. An example of network interface 128 is a network adapter, also referred to as a network interface controller (NIC). In some embodiments, a plurality of NICs is included as network interface 128. It should further be recognized that system hardware 118 also includes, or is connected to, conventional registers, interrupt handling circuitry, a clock, etc., which, for the sake of simplicity, are not shown in the figures.

One or more virtual machines (VMs) are configured within host computer 108, represented in FIG. 1 as VM 112, VM 114, and VM 116, which share the hardware resources of host computer 108. The VMs run on top of a software interface layer 138 (referred to herein as a "hypervisor") that abstracts processor, memory, storage, and/or networking resources and enables sharing of system hardware 118 of host computer 108 by the VMs. Hypervisor 138 may run on top of the operating system of host computer 108 or directly on hardware components of host computer 108.

Each VM is configured to provide a server service to plurality of clients 102 based on one or more server requests received via network 104. Each VM includes a guest operating system (OS) 130 and one or more guest applications running on top of guest OS 130. Each VM is configured to support a runtime environment 132 running on top of guest OS 130. In the embodiments illustrated herein, runtime environment 132 is a Java Virtual Machine (JVM) which enables a set of computer software programs and data structures to use a VM model for the execution of other computer programs and scripts. It should be recognized that other runtime environments and/or applications executing on top of the guest OS may be used without departing from the scope of the present invention. The embodiments presented should therefore not be interpreted to be exclusive or limiting, but rather exemplary or illustrative.

System resources (e.g., machine memory 120) utilized for executing runtime environments 132 may be re-allocated for more efficient use during periods of time in which runtime environments 132 are idle or inactive, according to embodiments described herein. In previous approaches and implementations to JVMs, a hypervisor, which is responsible for sharing resources between VMs, may be unable to effectively reclaim or re-allocate memory from any of the VMs that may be idle and have JVMs running on them. For example, the hypervisor may reclaim guest "physical" memory of VMs utilized for storing live objects in a heap of the JVM, Just-in-Time (JIT) compilation caches, Java class data, etc. by inflating a balloon application or agent within a guest OS. However, the guest OS may be forced to page out memory utilized by the idle JVMs to the VM's virtual disk to relieve memory pressure caused by the ballooning. As such, when the idle JVMs later seek to, for example, process an incoming server request, the guest OS may have to page in the guest "physical" memory pages utilized by the JVMs, thereby incurring additional performance cost for the JVMs. Further, in some cases, if host computer 108 swaps out memory in response to memory pressure, this memory may be expensive to swap back in.

Accordingly, in one embodiment, methods and systems are described herein for compressing contents of guest physical memory pages of idle JVMs to make machine memory available to other processes (e.g., other VMs, etc.) running in the same host computer in a performance-efficient manner. Embodiments of the present invention provide a system that reduces the memory footprint of an idle JVM while still keeping the JVM "live" by using a hypervisor memory reclamation technique for page compression.

Figure 2:
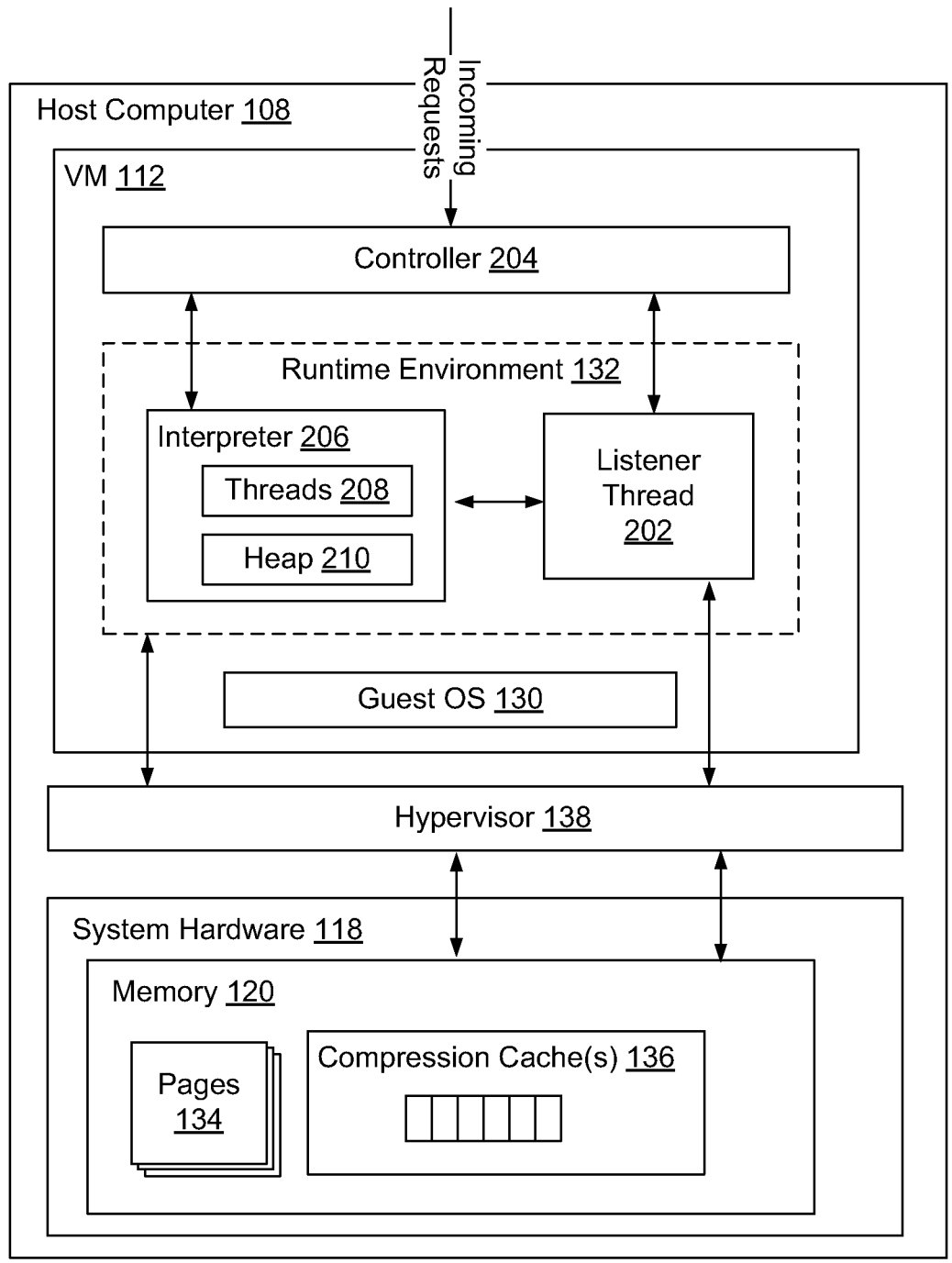
FIG. 2 illustrates, in greater detail, a virtual machine configured to perform one or more idle memory management procedures while executing a runtime environment.

FIG. 2 illustrates, in greater detail, a VM (e.g., VM 112) configured to perform one or more idle memory management procedures while executing a runtime environment 132 (e.g., JVM). To simplify the description, description of VMs 114, 116 are omitted but it should be understood that VMs 114, 116 may be configured similarly to VM 112. For clarity of discussion, the term "machine memory" refers to actual hardware memory that is visible to hypervisor 138. The term "guest 'physical' memory" refers to a software abstraction used to provide the illusion of hardware memory to a VM. Guest "physical" memory is generally visible to a guest OS running on a VM. Guest "physical" memory is backed by machine memory and hypervisor 138 provides a mapping from guest "physical" memory to machine memory. The term "guest virtual memory" refers to a continuous virtual address space presented by a guest OS to applications running inside a VM.

As shown, VM 112 includes runtime environment 132 having a listener thread 202 communicatively connected to a controller 204. Controller 204 is an intermediary layer between runtime environment 132 and outside entities, such as clients 102. In one embodiment, listener thread 202 is a thread executing on runtime environment 132 to listen for a "refresh" and "hibernate" signals from controller 204.

In one embodiment, controller 204 is an intermediary layer running on VM 112 that receives requests (e.g., HTTP requests) from clients 102 and determines whether runtime environment 132 should be hibernating or refreshed based on a variety of criteria and mechanisms for detecting idleness. In the embodiment shown in FIG. 2, controller 204 is a process executing on the same VM 112 as runtime environment 132. In some embodiments, controller 204 may be an inter-process communication proxy for runtime environment 132 configured such that attempts to access runtime environment 132 first go through controller 204. For example, in one implementation, controller 204 may be a TCP/IP socket proxy for runtime environment 132 configured such that attempts to connect to runtime environment 132 via a socket, e.g., HTTP request, remote method invocation (RMI), rich client platform (RCP), Java management extensions (JMX) monitoring, first go through controller 204. Such attempts may be deemed by controller 204 as an access attempt to runtime environment 132. If no attempt has been made to access runtime environment 132 for a pre-determined period of time (e.g., 6 hrs, 1 day, 2 days), controller 204 triggers a "hibernate" signal that is sent to listener thread 202 indicating that runtime environment 132 should be placed in a state of hibernation. Any new access attempt intercepted by controller 204 triggers a "refresh" signal to be sent to listener thread 202 indicating that runtime environment 132 should be woken up in order to respond to the access attempt (e.g., client request). Controller 204 may be configured to trigger a refresh signal in anticipation of incoming requests, or in response to detecting an increased volume of incoming requests, for example, in an embodiment where controller 204 acts as a load balancer for a plurality of runtime environments, as described later in conjunction with FIG. 4B. In one embodiment, any existing JMX socket connections may be maintained such that monitoring tools using the JMX socket connections are not disconnected. Any new JMX monitoring connection, however, may be deemed an access attempt by controller 204 and may cause runtime environment 132 to be woken up.

Runtime environment 132 may include an interpreter 206 that executes computer software programs and scripts utilizing a virtual machine model, and a heap 210 configured to store live Java objects and other data structures for use by the computer software programs and executed by the interpreter 206. During execution, runtime environment 132 is stored within a plurality of guest virtual memory pages, which may be backed by a plurality of memory pages 134 within machine memory 120.

In one embodiment, runtime environment 132 is a runtime having a plurality of native internal JVM threads executing on guest OS 130. While these native internal JVM threads run within the process of runtime environment 132, the threads perform auxiliary tasks not directly related to the running of Java code. Examples of internal JVM threads include a thread that runs interpreter 206, a thread that runs a Just-in-Time (JIT) compiler, and a thread that performs garbage collection for runtime environment 132. Runtime environment 132 further manages a plurality of Java threads 208 designated for running program code (e.g., Java code). In some embodiments, Java threads 208, sometimes referred to as user threads, may include the initial thread of an application that, e.g., that begins with a main( )method, as well as additional threads started up by the application itself. It should be recognized that in some implementation a Java thread 208 may be mapped one-to-one to a native thread managed by the underlying guest OS 130.

In one embodiment, listener thread 202 is a thread executing on VM 112 configured to monitor for one or more signals for runtime environment 132 indicating "hibernate" or "refresh" from controller 204. Listener thread 202 is configured to continue to execute even while a portion or all of runtime environment 132 is hibernating. In the embodiment shown in FIG. 2, listener thread 202 is a non-Java (i.e., native) thread running in runtime environment 132. As mentioned above, runtime environment 132 may include native internal threads that run within the process of runtime environment 132 and perform auxiliary tasks not directly related to the running of Java code. Listener thread 202 may be configured as one such native internal JVM thread. Alternatively, listener thread 202 may be a native process separate from runtime environment 132 and running on guest OS 130 of VM 112, as depicted later in conjunction with FIG. 4A.

Hypervisor 138 coordinates virtual resources for one or more VMs that are executing runtime environments 132. In one embodiment, hypervisor 138 and runtime environment 132 are configured to coordinate with each other, such that guest "physical" memory pages associated with runtime environment 132 may be paged in and paged out using memory compression on the guest "physical" memory pages. As such, runtime environment 132 is configured such that services and components necessary for listener thread 202 to remain actively executed and receive calls to hibernate and refresh while portions of runtime environment 132 are paged-out and/or compressed according to one or more idle memory management techniques described herein. While memory compression is one example described herein, it is contemplated that other procedures and/or mechanisms may be utilized for managing guest physical memory pages utilized by hibernated JVMs, for example, such as swapping the guest physical memory pages to a low-latency disk, such as SSD memory.

In one embodiment, hypervisor 138 manages compression caches 136 to store and release memory pages therein. To make space available in machine memory 120, pages 134 may be compressed and stored in a compression cache area 136 in machine memory 120. For example, compression cache 136 may store individual 4 KB pages that have been compressed into fixed 2 KB fractional pages. If a compressed page is requested by hypervisor 138, the compressed page may be removed from the compression cache 136, decompressed, and stored in a space in machine memory 120 corresponding to a virtual address space of runtime environment 132. Should more available memory be requested, compressed pages may also be removed from compression cache 136 and swapped to disk.

Figure 3A:
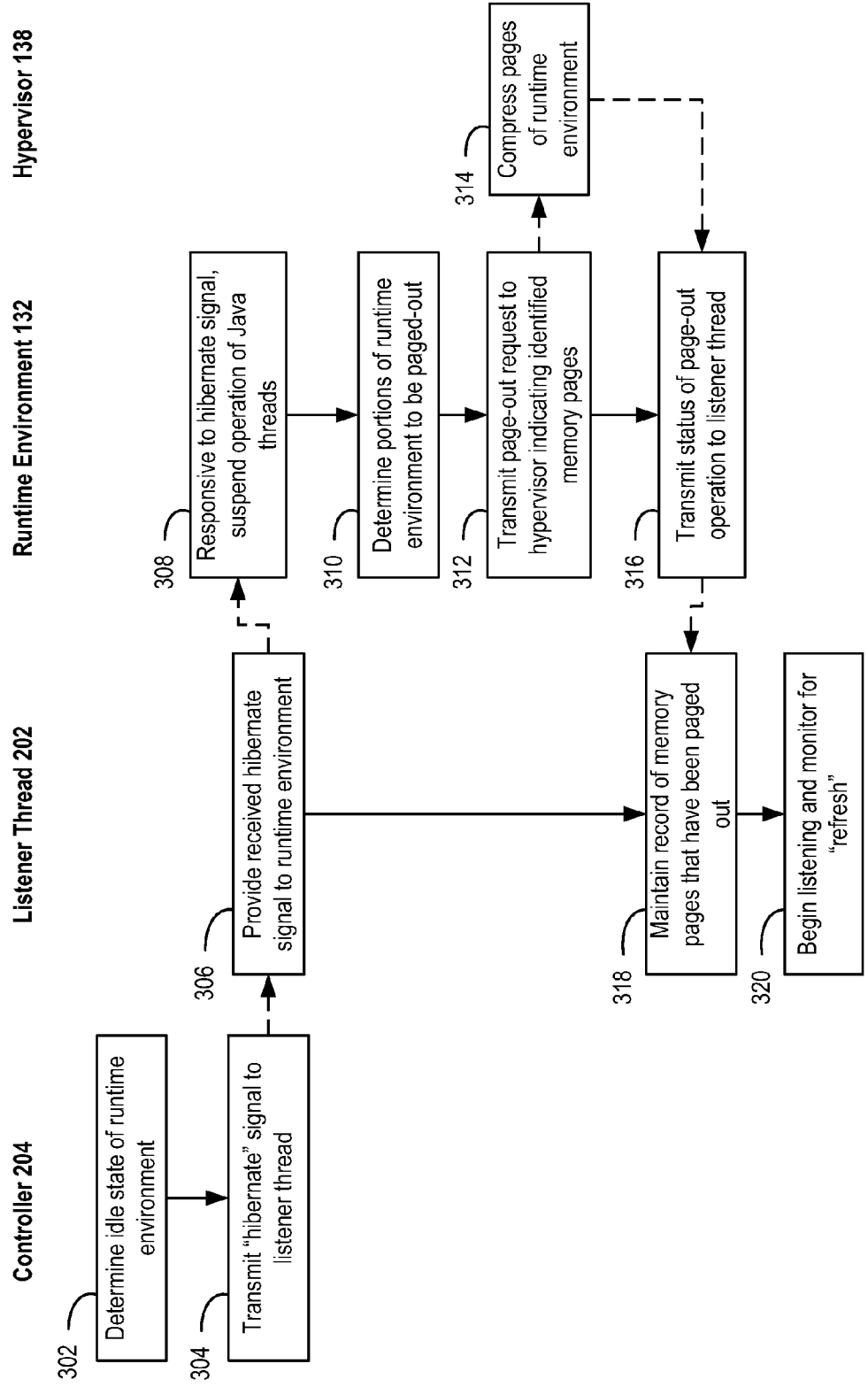
FIGS. 3A and 3B shows exemplary operations for managing memory in a host system where virtual machines (VMs) execute, in accordance with one embodiment of the invention.
Figure 3B:
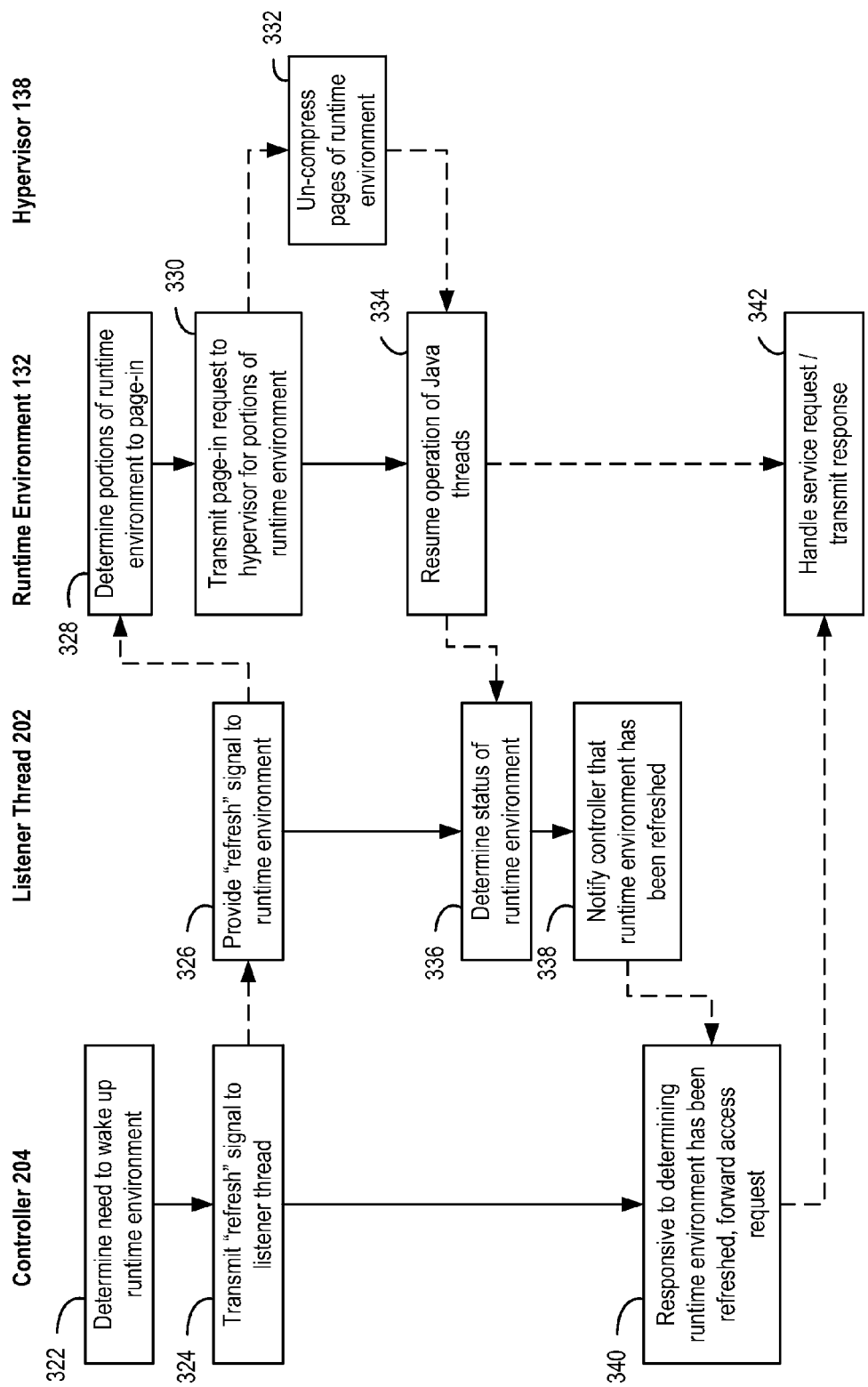

FIGS. 3A and 3B shows exemplary operations for managing memory in a host system where virtual machines (VMs) execute, in accordance with one embodiment. The processes in FIGS. 3A and 3B describe the operations performed in reference to the system of FIG. 2. In one embodiment, the method starts at step 302, where controller 204 determines that runtime environment 132 has entered an idle state. Controller 204 may determine an idle period of runtime environment 132 based on a variety of criteria and/or mechanisms. In some embodiments, controller 204 determines that runtime environment 132 has entered an "idle" state if the controller 204 detects a period of "inactivity" having a duration of some predetermined threshold (e.g., 6 hrs, 1 day, 2 days). In some embodiments, controller 204 determines runtime environment 132 has entered an idle state based on a lack of access attempts from external clients for a duration of some predetermined threshold. In some embodiments, controller 204 determines an "idle" state based on an indication from hypervisor 138 (e.g., via API call) detecting how active memory usage is by runtime environment 132. Responsive to determining an idle state of runtime environment 132, controller 204, at step 304, transmits a "hibernate" signal to listener thread 202 to initiate hibernation and memory compression procedures of runtime environment 132. At step 306, listener thread 202 provides the received "hibernate" call to runtime environment 132.

At step 308, responsive to "hibernate" signals received from listener thread 202, runtime environment 132 suspends operation of running threads associated with runtime environment 132 (e.g., Java threads 208). At step 310, runtime environment 132 determines portions of runtime environment 132 (and their associated guest virtual memory pages) can be paged out, and compressed and stored in compression cache 136. In some embodiments, runtime environment 132 may identify guest virtual memory pages associated with the now-suspended Java threads (e.g., Java threads 208) may be paged out and compressed. In some embodiments, runtime environment 132 may identify that guest virtual memory pages associated with the entire runtime environment process 132, including Java threads 208, heap 210, and interpreter 206, may be paged out and compressed. In some embodiments, runtime environment 132 may identify data structures associated with runtime environment 132, including stacks for related to Java threads 208, live Java objects in heap 210, JIT cache, and loaded Java class data, may be paged out and compressed. In one embodiment, parts of runtime environment 132 required for operation of listener thread 202, e.g., a core part of interpreter 206 needed to support listener thread 202, may be retained in an uncompressed format within guest physical memory. Accordingly, in contrast to previous approaches to memory management that merely reclaimed pages previously occupied by garbage in heap 210 (e.g., via memory ballooning), embodiments of the present disclosure advantageously provide techniques by which to reclaim pages occupied by live memory (e.g., live objects in heap 210, class data, etc.).

At step 312, runtime environment 132 communicates to hypervisor 138 a page-out request indicating the identified memory pages to be compressed. In some embodiments, the integration between hypervisor 138 and runtime environment 132 is a "backdoor" call via a modification to runtime environment 132. Runtime environment 132 may hint (e.g., via backdoor call) blocks of guest memory pages to hypervisor 138 as being candidates for memory page compression.

At step 314, hypervisor 138 compresses guest "physical" memory pages indicated by runtime environment 132 and places compressed pages within compression cache 136. As such, guest "physical" memory pages may be more quickly restored than if the guest "physical" memory pages had been paged out to disk, which would cost an expensive disk access, while still benefiting from relatively large amounts of space savings recovered (e.g., 90% compression in some cases). Accordingly, embodiments advantageously enable a runtime environment 132 to refresh quickly from a suspended state with little to no penalty in response time. It is appreciated that machine memory pages that were used by the idle runtime environment 132 (but are not compressed in compression cache 136) may be repurposed (not shown) by hypervisor 138 for use by other VMs and/or other runtime environments executing therein that are active, thereby allowing for a more efficient use of memory resources.

In some embodiments, listener thread 202 may be configured to maintain a record of which guest "physical" memory pages of runtime environment 132 have been compressed. As such, at step 316, runtime environment 132 may transmit a status of the page-out operation to listener thread 202, which includes memory address or other identifiers specifying portions of the runtime environment 132 that have been paged out and compressed. At 318, listener thread 202 updates a record of which guest "physical" memory pages of runtime environment 132 have been compressed based on the received page-out status. At step 320, listener thread 202 begins listening and monitoring for any "refresh" calls from controller 204 to waken runtime environment 132.

FIG. 3B illustrates a sequence diagram illustrating a "refresh" process for runtime environment 132. As shown, the method begins at step 322 where controller 204 determines a need to refresh runtime environment 132, currently in a "hibernation" state. For example, controller 204 may determine that runtime environment 132 should be refreshed, or awoken, to respond to one or more access attempts from clients 102. At step 324, controller 204 performs a "refresh" call to transmit a "refresh" signal to listener thread 202.

At step 326, listener thread 202 provides the refresh signal to runtime environment 132. In one embodiment where listener thread 202 maintains a record of guest "physical" memory pages of runtime environment 132 that are paged-out and compressed, listener thread 202 may make an initial determination of which set of guest "physical" memory pages should be paged-in. In some embodiments, listener thread 202 may cycle through records of compressed guest "physical" memory pages and indicate to hypervisor 138 that certain guest "physical" memory pages are to be decompressed and made available, and may indicate such to runtime environment 132 at step 326. As such, listener thread 202 may determine which guest "physical" memory pages should be paged-in without having to awaken runtime environment 132 in its entirety to make the same determination.

In an alternative embodiment, listener thread 202 may perform a separate call to hypervisor 138 to determine the compressed or decompressed state for each compressed block of memory. This would allow listener thread 202 to inform controller 204 when a runtime environment has been fully refreshed. It is appreciated that even if the runtime environment were to "wake" up of its own accord or otherwise prematurely, hypervisor 138 would be able to decompress guest "physical" memory pages on demand when memory is accessed.

At step 328, responsive to receiving the refresh signal from listener thread 202, runtime environment 132 determines which portions of runtime environment 132 need to be paged-in to address the one or more access attempts received. In some embodiments, the plurality of memory pages to be paged in and decompressed may be determined based on a state of the listener thread that tracks the plurality of memory pages that have been compressed.

At step 330, runtime environment 132 communicates to hypervisor 138 a request to decompress and page-in previously compressed pages of runtime environment 132. At step 332, responsive to a page-in request from runtime environment 132, hypervisor 138 un-compresses and pages-in the requested pages associated with runtime environment 132 from compression cache 136 into memory. Accordingly, by utilizing a rapid memory page-in technique such as memory compression, embodiments have low resulting latency (for example, compared to high latency of disk swapping) and enables runtime environment 132 to swiftly resume operation in response to access attempts.

At step 334, runtime environment 132 resumes operation of one or more thread associated with runtime environment 132 (e.g., Java threads 208). In some embodiments, listener thread 202 may notify controller 204 when runtime environment 132 has been fully refreshed or hibernated. In such embodiments, at step 336, listener thread 202 may communicate with hypervisor 138 to determine a status of runtime environment. In some embodiments, to determine status of runtime environment 132, listener thread 202 may make a call (not shown) to hypervisor 138 for each compressed guest "physical" memory page, as known according to the listener thread's records, to determine the compressed or decompressed state of the guest "physical" memory page. This separate call would allow listener thread 202 to inform controller 204 when a runtime environment 132 has been fully refreshed. At step 338, listener thread 202 may notify the controller 204 that the runtime environment has been refreshed and is now available. In one embodiment, the listener thread 202 may terminate execution until a next time in which the runtime environment hibernates and launches the listener thread anew.

In one embodiment, at step 340, responsive to determining that runtime environment 132 has been refreshed, controller 204 may forward one or more access requests to the runtime environment. For example, the controller may forward a web service request to be handled by a web application server executing in the runtime environment. At step 342, the runtime environment may provide one or more server services responsive to the received access attempt for which runtime environment 132 was refreshed. In some embodiments, the runtime environment may return a request response through the controller or directly to the requesting client (e.g., client 102).

Figure 4A:
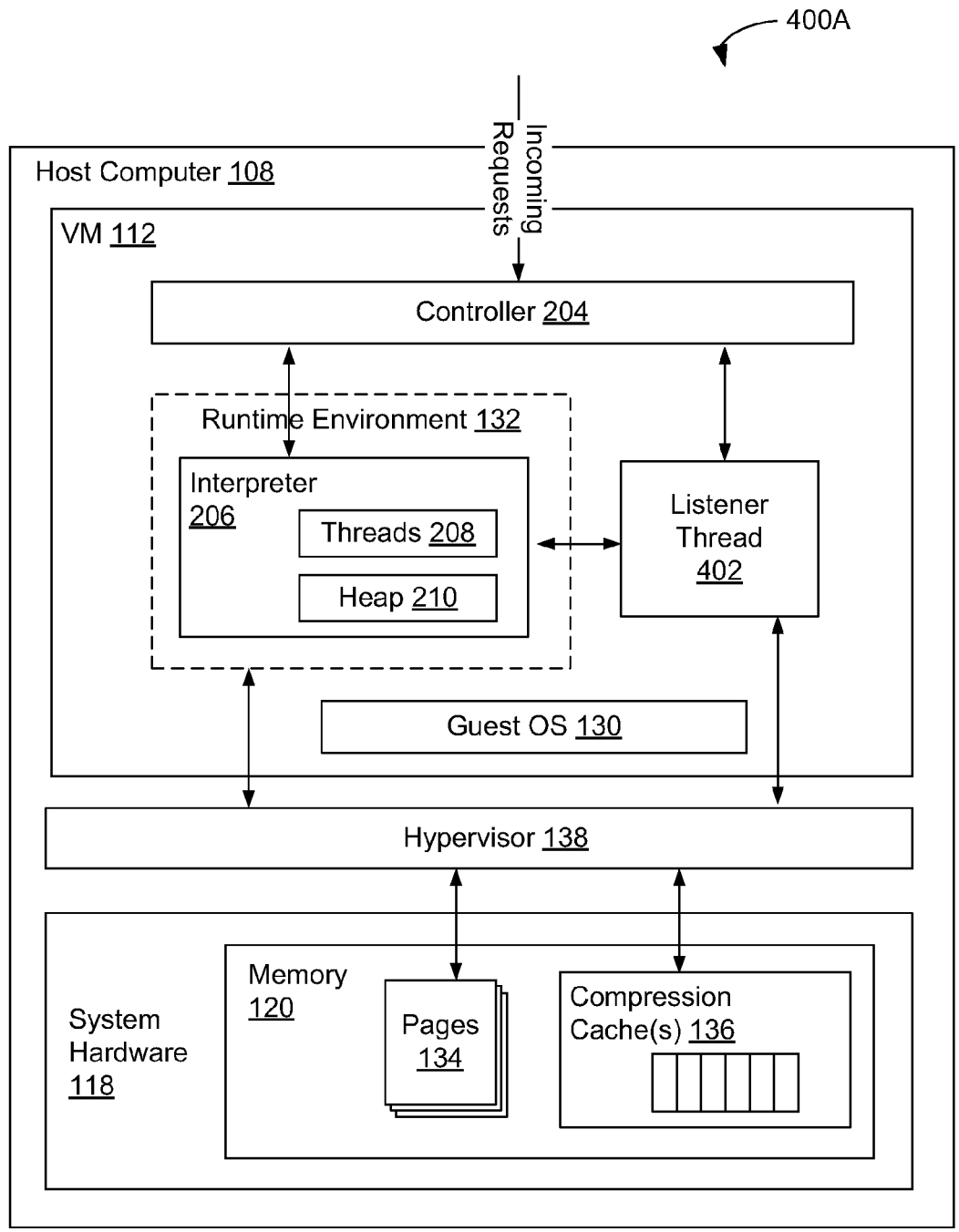

FIG. 4A illustrates one alternative embodiment of virtualized computer system 100 depicted in FIG. 2. In the alternative embodiment 400A shown, a listener thread 402 is configured similarly to listener thread 202, except that listener thread 402 is a native process executing on VM 112 and is separate from runtime environment 132. As such, runtime environment 132 may be configured such that the entirety of runtime environment 132 (i.e., all memory pages) may be compressed and paged-out by hypervisor 138.

FIG. 4B illustrates another alternative embodiment of a virtualized computer system 400B, similar to virtualized computer system 100 shown in FIG. 2. In the alternative embodiment 400B shown in FIG. 4B, a controller 404 is an intermediate layer similar to controller 204 shown in FIG. 2, except that controller 404 is a fully functional load balancer component external to VMs 112, 114, 116 and that is configured to manage requests to VMs 112, 114, 116.

Similar to controller 204, controller 404 utilizes a trigger mechanism for determining whether to hibernate and/or refresh runtime environments 132. Controller 404 is configured to determine whether to hibernate runtime environments 132 based on its determination of "load" (e.g., demand of incoming requests) and a pre-determined service level (e.g., a pre-determined maximum level of latency). Controller 404 is configured to balance load between runtime environment processes executing on VMs 112, 114, 116 and determines how many runtime environments need to be alive at any given time to maintain the pre-determined service level. For example, when controller 404 detects a decreased incoming load across all VMs 112, 114, 116, controller 404 performs a "hibernate" call to one or more runtime environments 132 and may direct incoming server requests to those VMs having active runtime environments 132. Since controller 404 (i.e., load balancer) provides a level of abstraction from runtime environments 132, it is acknowledged that a user or client 102 would have to accept that a hibernated runtime environment 132 may not respond to monitoring requests.

Similarly, as an external load balancer, controller 404 may determine that incoming load exceeds capabilities of already active runtime environments and, in response, "refresh" a hibernating runtime environment 132. In other words, controller 404 would deem in such cases that horizontal scale-out needs to be increased in order to accommodate increased load. In some cases, a "refresh" request may take too long to handle a particularly urgent client request. In this case, controller 404 as a load balancer may choose to trigger a refresh in anticipation of incoming requests, thus expanding the available compute resources. For example, in cases where the runtime environments provide web application servers, such tight integration of the runtime environment and controller 204 acting as a load balancer may advantageously improve performance while efficiently using the allocated resources of the virtualized environment.

It is contemplated that embodiments of the invention are not limited to the arrangements described above, and that the components of virtualized computing system 100 may be utilized in a variety of configurations and arrangements. For example, in the embodiment shown in FIG. 4B, VM 112 includes a listener thread 202 that is a native thread embedded in runtime environment 132 similar to listener thread 202 shown in FIG. 2. In another example, VM 114 includes a listener thread 402 that is a process outside of runtime environment 132, similar to listener thread 402 shown in FIG. 4A.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method for managing memory of a runtime environment executing in a virtual machine, the method comprising:
    receiving an indication of an idle state of a runtime environment executing in a virtual machine;
    suspending operation of a plurality of threads associated with the runtime environment, wherein the plurality of threads is configured to run program code within the runtime environment;
    determining a plurality of memory pages associated with the runtime environment based on the indication of the idle state;
    transmitting, to a virtualization layer, a request to page out and compress the plurality of memory pages into a compression cache; and
    executing a listener thread configured to monitor for a refresh request for the runtime environment.

2. The method of claim 1, wherein the listener thread is a native internal thread of the runtime environment.

3. The method of claim 1, wherein the listener thread is a native thread executing in the virtual machine outside of the runtime environment.

4. The method of claim 1, wherein the determining the plurality of memory pages further comprises:
    identifying the plurality of memory pages corresponding to heap memory of the runtime environment.

5. The method of claim 1, further comprising:
    responsive to receiving an indication to refresh the runtime environment, determining the plurality of memory pages for the runtime environment to be paged in; and
    transmitting, to the virtualization layer, a request to decompress and page in the plurality of memory pages from the compression cache.

6. The method of claim 5, wherein the determining the plurality of memory pages to be paged in further comprises:
    determining the plurality of memory pages to be paged in and decompressed based on a state of the listener thread that tracks the plurality of memory pages that have been compressed.

7. The method of claim 1, wherein the idle state of the runtime environment is determined based on a number of access attempts to the runtime environment received during a predetermined period of time.

8. A non-transitory computer-readable storage medium comprising instructions that, when executed in a computing device, manage memory of a runtime environment executing in a virtual machine by performing the steps of:
    receiving an indication of an idle state of a runtime environment executing in a virtual machine;
    suspending operation of a plurality of threads associated with the runtime environment, wherein the plurality of threads is configured to run program code within the runtime environment;
    determining a plurality of memory pages associated with the runtime environment based on the indication of the idle state;
    transmitting, to a virtualization layer, a request to page out and compress the plurality of memory pages into a compression cache; and
    executing a listener thread configured to monitor for a refresh request for the runtime environment.

9. The non-transitory computer-readable storage medium of claim 8, wherein the listener thread is a native internal thread of the runtime environment.

10. The non-transitory computer-readable storage medium of claim 8, wherein the listener thread is a native thread executing in the virtual machine outside of the runtime environment.

11. The non-transitory computer-readable storage medium of claim 8, wherein the instructions for determining the plurality of memory pages further comprises instructions for:
identifying the plurality of memory pages corresponding to heap memory of the runtime environment.

12. The non-transitory computer-readable storage medium of claim 8, further comprising instructions for:
responsive to receiving an indication to refresh the runtime environment, determining the plurality of memory pages for the runtime environment to be paged in; and
transmitting, to the virtualization layer, a request to decompress and page in the plurality of memory pages from the compression cache.

13. The non-transitory computer-readable storage medium of claim 12, wherein the instructions for determining the plurality of memory pages to be paged in further comprises instructions for:
determining the plurality of memory pages to be paged in and decompressed based on a state of the listener thread that tracks the plurality of memory pages that have been compressed.

14. The non-transitory computer-readable storage medium of claim 8, wherein the idle state of the runtime environment is determined based on a number of access attempts to the runtime environment received during a predetermined period of time.

15. A computer system for executing an application on a host computer executing a plurality of virtual machines therein, comprising:
a system memory comprising a plurality of memory pages;
a virtualization layer, executing on one or more processors, configured to manage sharing of the system memory among a plurality of virtual machines;
a first virtual machine of the plurality of virtual machines having a runtime environment and a listener thread executing therein, wherein the runtime environment comprises a plurality of threads configured to run program code within the runtime environment, wherein the listener thread is configured to monitor for hibernate requests and refresh requests for the runtime environment;
a controller configured to determine an idle state of the runtime environment, and transmit a hibernate request to the runtime environment indicating the idle state;
wherein the runtime environment configured to:
responsive to receiving the hibernate request, suspend operation of the plurality of threads associated with the runtime environment,
determine a plurality of memory pages associated with the runtime environment based on the hibernate request, and
transmit, to the virtualization layer, a request to page out and compress the plurality of memory pages into a compression cache.

16. The computer system of claim 15, wherein the listener thread is a native internal thread of the runtime environment.

17. The computer system of claim 15, wherein the listener thread is a native thread executing in the virtual machine outside of the runtime environment.

18. The computer system of claim 15, wherein the controller is further configured to transmit, to the listener thread, a refresh request to the runtime environment;
wherein in the runtime environment is further configured to determine the plurality of memory pages for the runtime environment to be paged in responsive to receiving the refresh request, and transmit, to the virtualization layer, a request to decompress and page in the plurality of memory pages from the compression cache.

19. The computer system of claim 15, wherein the controller is configured to determine the idle state of the runtime environment based on a number of access attempts to the runtime environment received during a predetermined period of time.

20. The computer system of claim 15, wherein the controller IS a load balancer configured to manage requests to the plurality of virtual machines.

21. The computer system of claim 15, wherein the controller is an inter-process communication proxy for runtime environment configured to manage requests to access the runtime environment via socket.

* * * * *